(12) United States Patent
Engelbrecht et al.

(10) Patent No.: US 8,511,741 B2
(45) Date of Patent: Aug. 20, 2013

(54) RECREATIONAL VEHICLE HAVING CHASSIS WITH INTEGRAL CAP

(75) Inventors: Roy Frank Engelbrecht, Charlotte, MI (US); Russell Floyd Rugg, Bellevue, MI (US); Terry Kyle Olson, Greenfield, WI (US); Michael Allen Campeau, Lansing, MI (US); Michael Paul Boks, Charlotte, MI (US)

(73) Assignee: Spartan Motors, Inc., Charlotte, MI (US)

( * ) Notice: Subject to any disclaimer, the term of this patent is extended or adjusted under 35 U.S.C. 154(b) by 351 days.

(21) Appl. No.: 12/949,489

(22) Filed: Nov. 18, 2010

(65) Prior Publication Data

US 2011/0121606 A1 May 26, 2011

Related U.S. Application Data

(60) Provisional application No. 61/263,002, filed on Nov. 20, 2009.

(51) Int. Cl.
*B60P 3/00* (2006.01)

(52) U.S. Cl.
USPC .......................................................... 296/156

(58) Field of Classification Search
USPC ................. 296/166, 156, 26.12, 164, 26.01, 296/26.13, 167; 280/781

IPC ........................................................... B60P 3/00
See application file for complete search history.

(56) References Cited

U.S. PATENT DOCUMENTS

| | | | | | |
|---|---|---|---|---|---|
| 3,625,560 | A | * | 12/1971 | Bjork | 296/166 |
| 3,638,991 | A | * | 2/1972 | Hathaway, Jr. | 296/166 |
| 3,801,150 | A | * | 4/1974 | Decoster et al. | 296/156 |
| 3,850,471 | A | * | 11/1974 | Johnson | 296/156 |
| 4,848,832 | A | * | 7/1989 | Starnes | 296/166 |
| 5,967,596 | A | * | 10/1999 | Knoop | 296/164 |
| 6,183,034 | B1 | * | 2/2001 | Moody et al. | 296/96.21 |
| 6,692,062 | B1 | * | 2/2004 | Woodard et al. | 296/164 |

* cited by examiner

*Primary Examiner* — Glenn Dayoan
*Assistant Examiner* — Pinel Romain
(74) *Attorney, Agent, or Firm* — Reinhart Boerner Van Deuren P.C.

(57) ABSTRACT

A recreational vehicle having a chassis with integral cap is provided. The recreational vehicle includes a cap having a front end and a back end and a pair of opposing sides. A roof encloses a portion of the top of the cap and the cap defines a driving space. The chassis is designed to house an engine block in a rear thereof, and support a living space thereon. The cap is configured for abutted contact with the living space such that the recreational vehicle has a continuous interior living space that includes the driving space.

20 Claims, 5 Drawing Sheets

RECREATIONAL VEHICLE HAVING CHASSIS WITH INTEGRAL CAP

CROSS-REFERENCE TO RELATED PATENT APPLICATIONS

This patent application claims the benefit of U.S. Provisional Patent Application No. 61/263,002, filed Nov. 20, 2009, the entire teachings and disclosure of which are incorporated herein by reference thereto.

FIELD OF THE INVENTION

This invention generally relates to recreational vehicles and more particularly to the chassis of a recreational vehicle.

BACKGROUND OF THE INVENTION

Contemporary recreational vehicles "RV's" currently possess several distinct body styles. Two such body styles are the class A style and the class C style, shown at FIGS. 1 and 2 respectively. As is the case with other body styles for RV's, the class A and class C body styles have several notable differences.

With reference to FIG. 1, class A RV's 10 are the largest motorized recreational vehicles, usually loaded with amenities and equipment that make it ideal for short or long trips, and even full-time living. The living structure 16 is built on a bare specially made chassis in lengths ranging from about 25 feet to 50 feet. Class A RV's 10 can be gas or diesel powered and include a variety of functional and aesthetic features.

A class A RV 10 is quickly identifiable by its unique body style. For example, class A RV's 10 typically do not incorporate doors that open directly to the driving space of the RV. Instead, class A RV's 10 utilize a side door (not shown) located along the length of the vehicle. Also, class A RV's 10 can be identified by their generally vertical front end 14 and large windshield.

The distinctive front end 14 of a class A RV 10 is due in part to the location of the engine of the vehicle. More particularly, in a class A RV 10, the engine block is ordinarily located proximate to the rear of the vehicle or elsewhere along the chassis other than a portion of the chassis proximate to the front end 14 of the vehicle. By moving the engine block away from the front of the vehicle, the driving area can be positioned closer to the front end 14 of the vehicle. Locating the driving area closer to the front end 14 of the vehicle has the advantage of increasing the overall living space 16 of the vehicle as well as providing a greater forward visibility for a driver of the vehicle.

Additionally, class A RV's 10 typically utilize more expensive braking and suspension systems than a class C type vehicle. For example, class A RV's 10 are ordinarily supplied with a primary braking system as well as an auxiliary braking system in the event the class A RV 10 is also towing another vehicle. Additionally, a class A RV 10 is typically supplied with an independent front suspension system and a rear suspension system. The independent front suspension system and rear suspension are typically air suspension systems that enhance the overall comfort of the passengers riding in the vehicle.

The front end 14 of a class A type vehicle is ordinarily classified as a cap 18. The cap 18 encloses a portion of the driving space of the class A RV 10 to include the dash area, seating area, and steering column. The cap 18 is mounted directly to the chassis of the class A RV 10 and the living space 16 thereafter is then welded to the cap 18 or mechanically joined via other methods such that the cap 18, living space 16, and chassis form a rigid structure. Alternatively, the cap 18 and living space 16 can be joined to the chassis of the class A RV 10 in a single operation.

As discussed above, the front end 14 of a class A RV is typically generally vertical, such as with a slant of typically about 5 degrees and no more than 15 degrees, thereby allowing the driver to be seated within the vehicle very close to the front end 14 thereof. The driver is ordinarily seated about 1' to about 3' away from the front end of the class A RV. The class A RV 10 is therefore identifiable by the shape and size of the cap 18 itself.

Class A RV's are typically manufactured from the "ground up." More particularly, class A RV manufacturers typically install a cap 18 and a living space 16 to a chassis supplied from a chassis vendor. As a result, class A RV manufacturers are typically well-versed in the interior design and functionality of the living space 16 as well as the interior design and functionality of the driving space contained within the cap 18. Accordingly, a class A RV 10 manufacturer must be knowledgeable in the design, manufacture, and certification of all of the controls and instruments contained within the driving space within the dash of the class A RV 10.

Referring now to FIG. 2, class C RV's 20, on the other hand, offer full living quarters, sleeping, kitchen and bathroom facilities, and conveniences similar to a class A RV's, but by design are a more compact unit. The living space 26 of a class C RV is typically installed upon a regular automotive truck chassis. The class C RV 20 typically ranges in length from about 20 feet to about 45 feet. As is the case with class A RV's 10, class C RV's 20 are readily identifiable by their unique body style. For example, class C RV's 20 have a front end that resembles a front end of a pickup truck. As a result, a class C RV 20 is identifiable by its automotive style two front doors 22. Additionally, the front end of a class C RV includes a sloped windshield 24 similar to the front end of a pickup truck. The engine block of a class C RV 20 is located in the front end of the vehicle also similar to a pickup truck type design. Additionally, and because the class C RV 20 typically utilizes a regular automotive truck chassis, the class C RV 20 is ordinarily supplied with a truck type suspension commonly used in pickup truck designs as well as a truck type braking system also commonly used in pickup truck designs.

As discussed above, a class C RV 20 has a front end that generally resembles the front end of a regular pickup truck. This distinctive front end of the class C RV 20 is generally referred to as the cab 28 of the RV. The cab 28 of a class C RV 20 generally incorporates features typically incorporated in a regular pickup truck type vehicle. As such, the driver of a class C RV is typically about 3 feet to about 6 feet from the front end of a class C RV, with the engine block positioned in front of the driver.

A class C manufacturer generally takes a modular approach to the fabrication of a class C RV 20. More particularly, a class C RV 20 manufacturer typically purchases a chassis with a pick up truck style cab 28 already installed. Accordingly, a class C RV 20 manufacturer completes the manufacture of a class C RV 20 by affixing a living space 26 to the pre-purchased chassis. Class C manufacturers that do not also manufacture class A type RV's are not involved with the design, manufacture, and certification of the controls and other instruments contained in the dash within the cab 28 of the class C RV 20.

In view of the differences between a class A RV 10 and a class C RV 20, several problems arise due to their stratification. For example, there are many social clubs that define their criteria of membership based upon the type of RV a potential member owns, e.g. class A versus class C. Similarly, many recreational vehicle parks limit the usage thereof exclusively to class A RV's 10. As a result, owners of the less expensive class C RV 20 are prevented from membership in the above clubs and also the usage of the above RV parks.

The structural and aesthetic differences between a class A RV 10 and a class C RV 20 also govern a large difference in cost between the two types of vehicles. As a result, a large portion of the recreational vehicle market is bifurcated between those who can afford a class A RV 10 and a class C RV 20. The same bifurcation is present to an extent with regard to the manufacturers of the class A RV's 10 and the class C RV's 20 as well. Indeed, some manufacturers have specialized exclusively in the manufacture of class A RV's 10, while other manufacturers have specialized exclusively in the manufacture of class C RV's 20. In light of the respective manufacturing processes discussed above for class A RV's 10 and class C RV's 20, many class C RV 20 manufacturers have limited their design and manufacture skill set to that required for the living space 26 alone, because the driving space and associated controls and hardware, e.g. tachometer speedometer, steering control system, are supplied by the manufacturer of the automotive chassis that the class C RV 20 will ultimately incorporate. As a result, an exclusive class C RV 20 manufacturer is limited to cab 28 and chassis designs available on the market, and cannot readily fabricate their own cabs 28 to suit their particular design criteria.

It is therefore desirable to have an RV that has the appearance of a class A RV offered at a class C RV price point. It is desirable that such an RV have the functional benefits of a class A such as incorporating a cap design as opposed to a cab design as well as enhanced braking and suspension systems typically offered in class A RV's. It is further desirable that such an RV be readily manufacturable by a class C RV manufacturer by installing a living space on a chassis supplied with a cap having all of the attendant driving controls and driving space interior amenities.

BRIEF SUMMARY OF THE INVENTION

In one embodiment, the invention provides an improved chassis for a recreational vehicle that incorporates a cap mounted on a frame as a stand alone unit ready for rapid adaptation into a recreational vehicle having an overall size similar to that of a class C RV. The recreational chassis according to this embodiment includes a frame and a cap mounted to the frame. The cap encloses a driving space. The cap and frame are configured to receive a living space of a recreational vehicle. The cap has a back end with an opening configured to provide access to the living space. In a further embodiment, the cap includes a generally vertical front end. The generally vertical front end, in one embodiment, has an angle of less than about 30 degrees relative to vertical.

In another embodiment, the cap includes a pair of sides in opposed spaced relation and extending transversely away from the generally vertical front end. Each of the pair of sides includes a forward structural support member and a rearward structural support member. The forward structural support members coincide with the generally vertical front end of the cap. The rearward structural support members define an end of the pair of sides. In another embodiment, the rearward structural support members each provide a mounting edge. The mounting edges are configured to receive a portion of the living space.

In another embodiment, a roof is formed between the pair of sides. The roof includes an opening. The opening is configured to receive the living space. In a further embodiment, the opening in the roof and the opening in the back end of the cap form a continuous opening.

In another embodiment, the invention provides an improved recreational vehicle that has the general appearance of a class A RV but having an overall size similar to that size of a class C RV. The recreational vehicle according to this embodiment includes a chassis having an interval cap with a generally vertical front end. The cap is carried by a frame of the chassis. The cap defines a driving space. A living space is mounted to the cap and mounted to frame. The living space is in direct communication with the driving space.

In another embodiment, the living space and the cap have a combined overall length of about 20 feet to about 40 feet. In another embodiment, the living space includes an access door configured to provide an access point for ingress and egress from the recreational vehicle. In a further embodiment, the cap is free of any doors such that access to the driving space is provided through the living space.

In another embodiment, the chassis includes an engine block carried by the frame. The engine block is located at an end of the frame opposite an end of the frame that carries the cap.

In another embodiment, the chassis is adapted to be supplied as a stand alone unit that receives the living space via a mechanical connection.

In yet another embodiment, a method for assembling a recreational vehicle is provided. The method according to this embodiment includes attaching a cap to a frame to form a stand alone chassis of the recreational vehicle. The method further includes attaching a living space to the frame and the cap after the step of attaching the cap to the frame as completed such that the living space and the driving space are in direct communication.

In another embodiment, the step of attaching the living space includes attaching the living space to the cap such that access to the cap is provided via the living space. In another embodiment, the step of attaching the living space includes mechanically joining the living space to the cap. In a further embodiment, the step of mechanically joining the living space to cap includes aligning a mounting edge of the cap with a leading edge of the living space and mechanically joining the mounting edge with a leading edge. In a further embodiment, the step of mechanically joining includes at least one of welding, bolting, and adhering with an adhesive a structural frame of the cap to a structural frame of the living space. In another embodiment, the step of attaching the living space to the cap and the frame includes attaching the living space such that the recreational vehicle has an overall length of between about 20 feet to about 45 feet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 3:
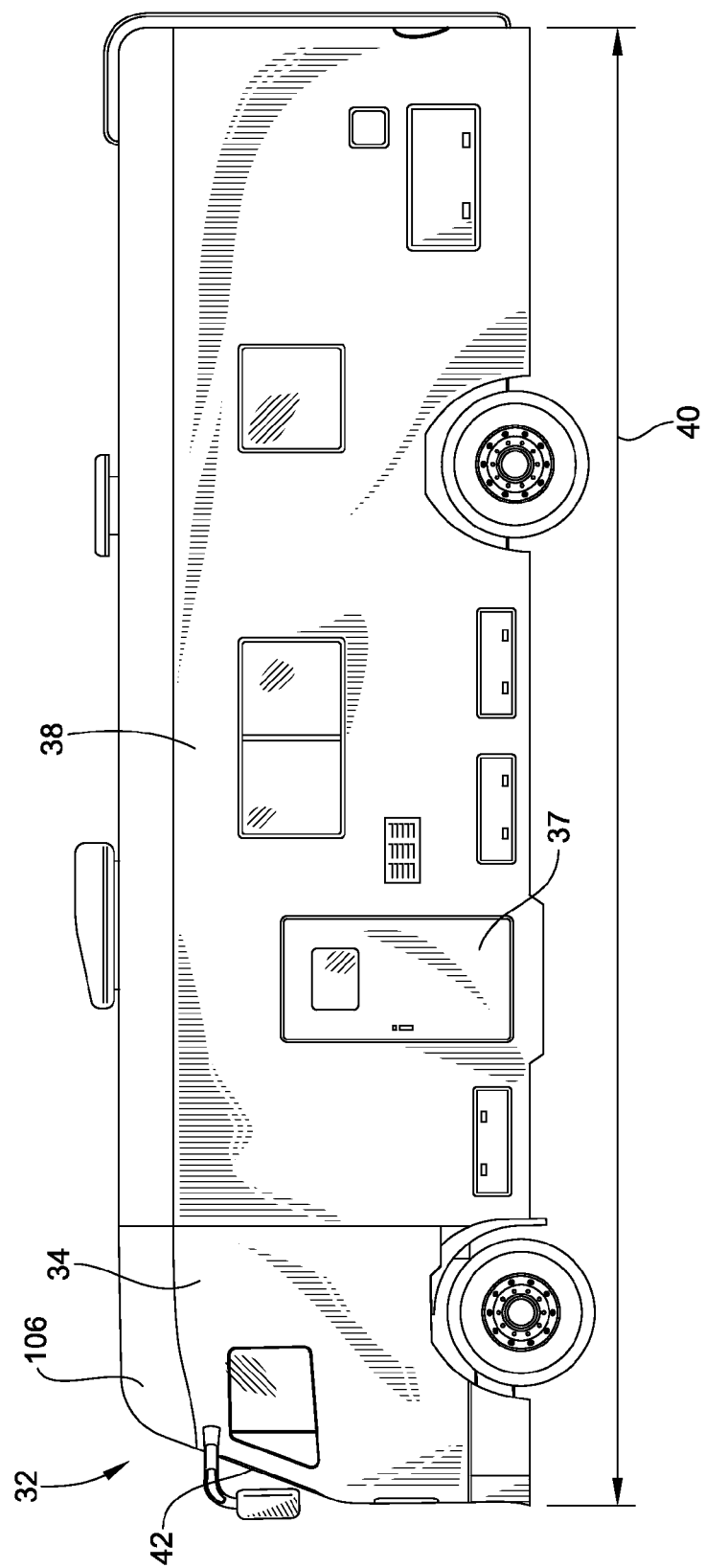
FIG. 3 is a side view of a recreational vehicle chassis having a frame with an integral cap mounted thereto according to the teachings of the present invention.

Turning now to the drawings, an improved recreational vehicle 32 is illustrated in FIG. 3. The recreational vehicle 32 includes a chassis that includes cap 34 mounted upon a frame 36 (see FIG. 5). A living space 38 is also mounted upon the frame 36 and mechanically affixed to the cap 34. The recreational vehicle 32 has an overall length 40 of about 20 feet to about 45 feet. As will be discussed in greater detail below the recreational vehicle 32 incorporates the body styling of a class A RV, as well as the associated functionality of a class A RV, while maintaining a size and a price point generally similar to a class C RV. Additionally, the cap 34 and frame 36 can be provided as a stand alone chassis, for later installation of the living space 38 such that the recreational vehicle can be quickly assembled.

Figure 1:
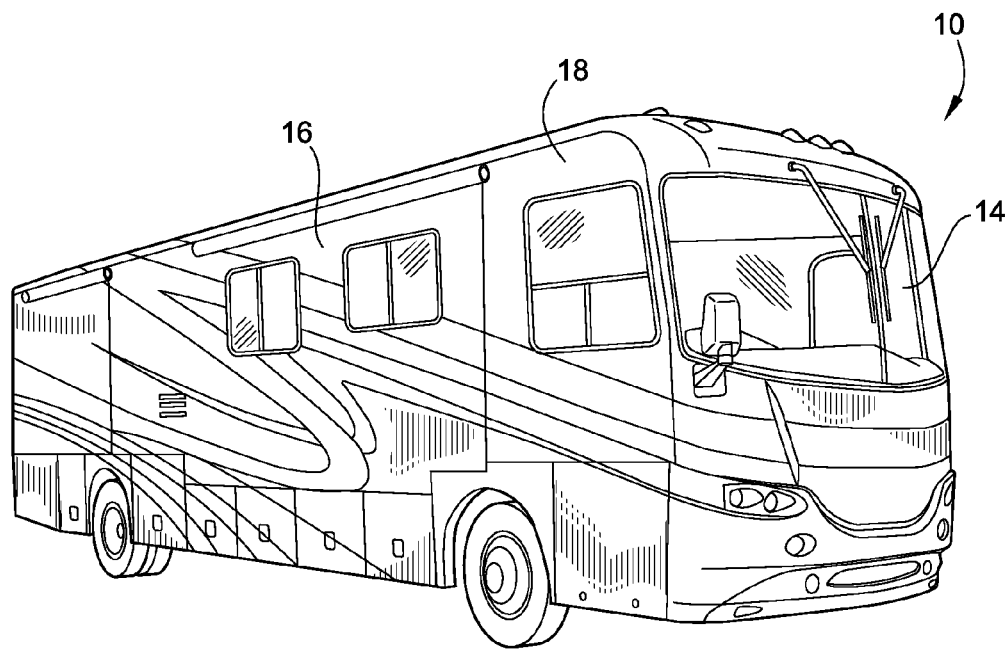
FIG. 1 is a perspective view of a prior art class A recreational vehicle.
Figure 2:
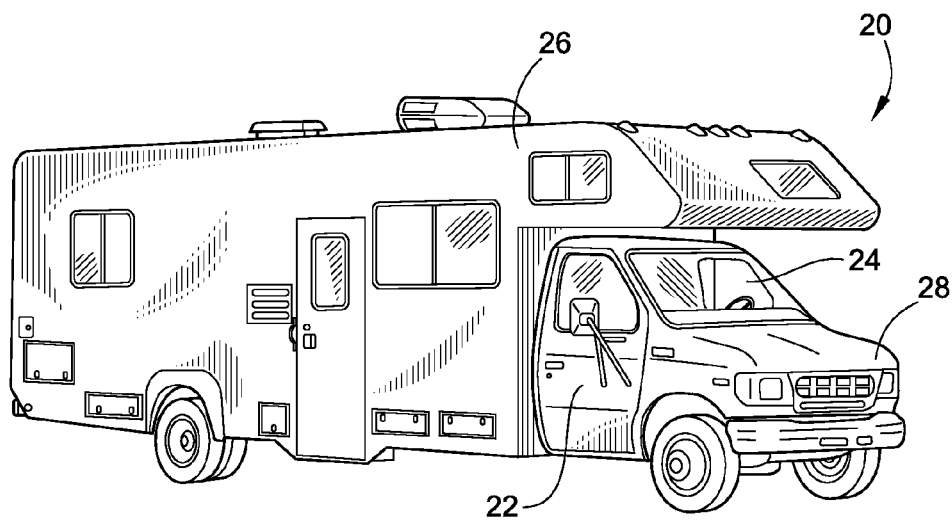
FIG. 2 is a perspective view of a prior art class C recreational vehicle.
Figure 4:
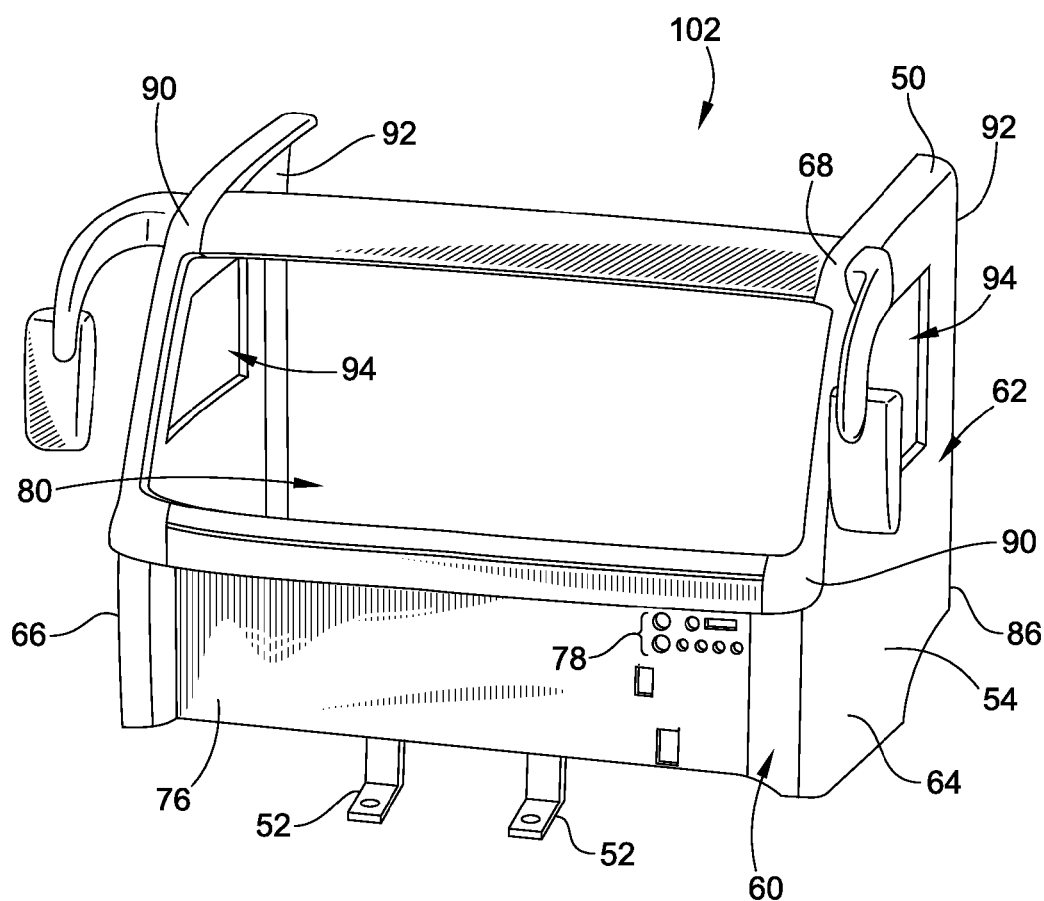
FIG. 4 is a perspective view of the cap of the recreational vehicle chassis of FIG. 3.

With reference now to FIG. 4, the cap 34 has a structural frame 50 with aesthetic paneling 54 mounted thereon. The structural frame 50 also includes a plurality of chassis mounts 52 configured to be used for mounting the cap 34 to the frame 36 (see FIG. 5). The structural frame 50 has the structural design of a class C RV cab while maintaining the class A RV body styling. As such, the cap 34 does not include truck like steps and side doors such as that of a typical class C RV (see e.g. FIG. 2), but nonetheless incorporates several structural similarities to a class C RV cab to provide enhanced safety and other benefits as described below. As a result, the interior of the cap is only accessible through the living space 38 by way of a side door positioned along the living space 38. However, in other embodiments, the cap 34 can include side doors, and/or truck-like steps similar to a class C RV design.

The structural frame 50 extends between a front end 60 and a back end 62. The structural frame 50 also includes a pair of opposing sides 64, 66, a roof 68, and a floor (not shown) extending therebetween to enclose an interior driving space 100 (see FIG. 5). The front end 60 has a generally vertical profile, preferably with an angle of less than 30 degrees relative to vertical, and more preferably with an angle of less than 20 degrees, and even more preferably with an angle of less than 10 degrees.

The front end 60 includes a bulkhead 76. The bulkhead 76 has a plurality of openings 78 configured to receive the steering column of the recreational vehicle 32 as well as various electrical cable assemblies. A windshield opening 80 is also formed into the front end. The windshield opening 80 is configured to receive a windshield that extends across a substantial portion of the front end 60. The windshield can be supplied as a conventional windshield that utilizes automotive glass, or an enhanced windshield such as a solar windshield or the like.

The back end 62, and more particularly the structural frame 50, has a generally vertical mounting edge 86 on each side thereof. The mounting edge 86 is adapted to receive or abut with a leading edge 126 of each side of the living space 38 (see FIG. 5). More particularly, the mounting edge 86 is designed to receive or abut with the leading edge 126 of the living space 38 in an abutted contact such that the living space and the cap can be mechanically connected and sealed by, for example, welding, bolting, and/or adhesives and the like.

The opposing sides 64, 66 are generally symmetric to one another. Each opposing side 64, 66 has a forward structural support member commonly referred to as an "A pillar" 90 and a rear structural support member commonly referred to as a "B pillar" 92. Interposed between the A and B pillars 90, 92 is a window opening 94. The window opening 94 is configured to receive a manual type window, or a power window. As such, the opposing sides 64, 66 introduce structural rigidity to the structural frame 50 in a similar fashion as a cab type design with doors, however, the structural frame 50 nonetheless maintains the general shape of a larger class A RV style cap. Accordingly, the cap 34 has a class A RV cap shape with the structural rigidity of a smaller class C RV cab.

The roof 68 extends between the opposing sides 64, 66 as well as the front and back ends 60, 62. A roof opening 102 is configured to receive a portion of the living space 38 such that the recreational vehicle 32 has a continuous interior space that includes the driving space and the living space when fully assembled. (see FIG. 6). By providing the cap 34 with a roof opening 102 and an open back end 62, no additional cutting of the cap 34 is required during assembly to achieve the continuous interior space. Although illustrated as having a roof opening 102, in other embodiments the roof 68 is supplied without an opening therein, e.g. for receipt of a living space that will not extend into the area of the opening. Additionally, the roof opening 102 can be supplied with a temporary seal to protect the driving space 100 of the cap 34 during shipment of the cap 34 and frame 36.

The structural frame 50 of the cap 34 is configured to receive aesthetic paneling 54. Because the cap 34 does not incorporate doors, the structural frame 50 requires relatively simple pieces of aesthetic paneling 54 to cover the structural frame 50. As discussed above, the cap 34 encloses the driving space 100 of the vehicle 32, and when supplied installed upon the frame 36, includes a variety of instruments mounted within a dash and an instrument panel (not shown), e.g. a speedometer, tachometer, information center, HVAC system and controls, and the like.

In certain embodiments, the interior of the cap 34 also introduces a variety of lighting and other aesthetic amenities to the driving space 100, e.g. dash lighting, courtesy lights, captain chair style heated seating, overhead consoles and a center console, sun visors, etc. The cap 34 also incorporates side view mirrors similar to a class A type RV that can further include a camera for enhanced safety. Furthermore, the cap 34 can also incorporate a collision detection system. By supplying the requisite instruments and interior elements discussed above with the cap 34 mounted on a frame 36, a class C RV manufacturer can fabricate a class A RV body style in a class C RV package without the need to address manufacturing issues not ordinarily addressed by a class C RV manufacturer, e.g. instrument design and certification, safety certification of restraints, etc.

Figure 5:
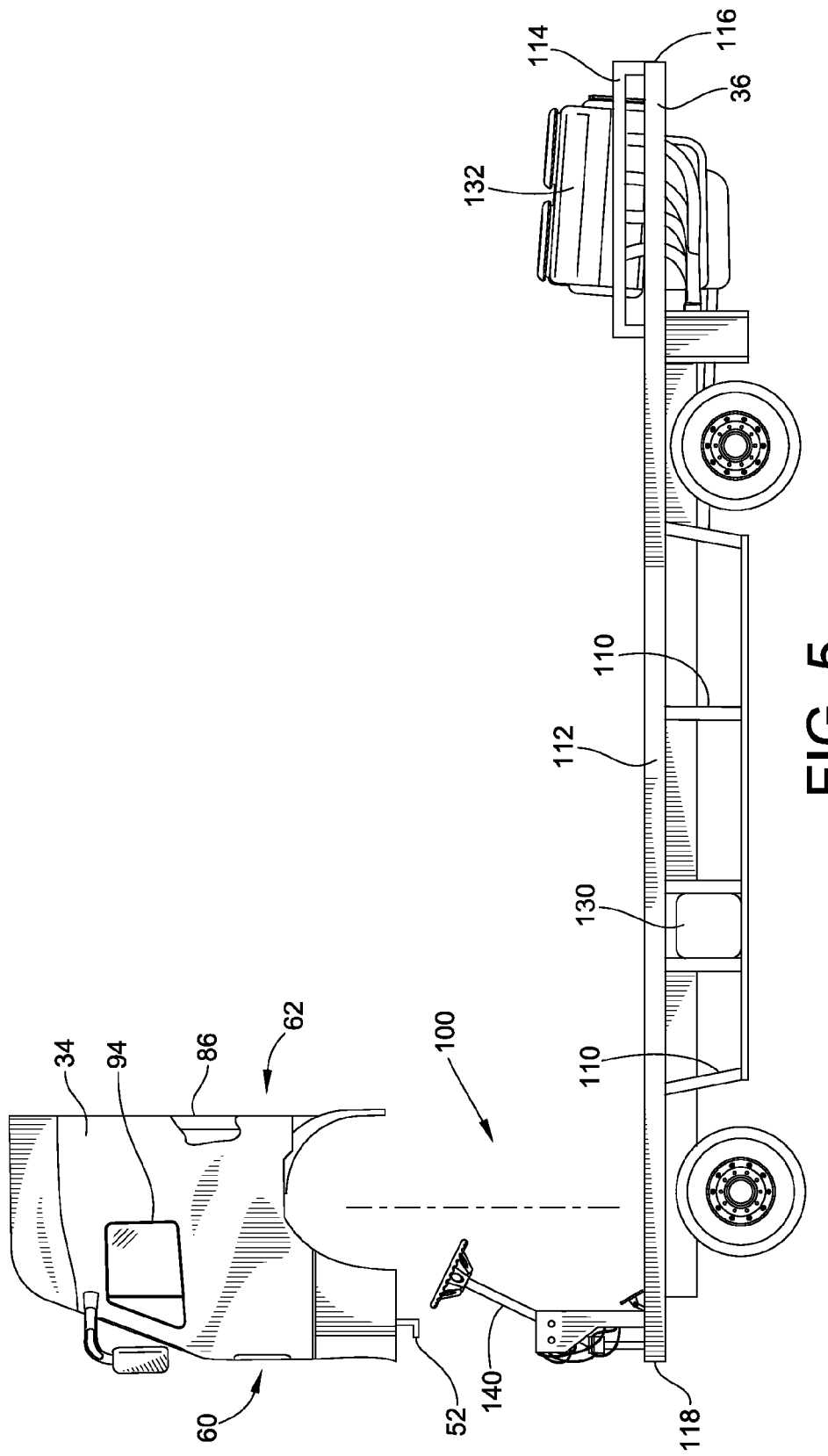
FIG. 5 is a side exploded view of the recreational vehicle chassis of FIG. 3 with the cap of FIG. 4 installed on a frame of the recreational vehicle of FIG. 3.

Turning now to FIG. 5, the frame 36 includes a plurality of vertical supports 110 and a plurality of lateral supports 112 forming a generally cage-like structure. The frame 36 also includes an engine cage 114 located at an end 116 of the recreational vehicle 32 opposite the cap 34. In certain embodiments, the engine cage 114 incorporates sound and thermal shielding to further enhance the comfort of passengers within the vehicle 32. The engine cage 114 provides additional structural support to the frame 36 and reduces vibration and thermal transfer to the remainder of the vehicle 32. Additionally, the cap 34 is not limited to the particular embodiment of a frame 36 as illustrated in FIGS. 5 and 6, but instead can be installed upon other frames, such as for non-limiting example a standard ladder type "C" channel frame chassis.

The engine block mounts to the frame 36 at the rear 116 of the recreational vehicle 32 unlike a typical class C RV. This functionality of the frame 36 allows the cap to maintain a generally vertical forward appearance. As a result, a driver seated within the cap has greater forward visibility over a typical class C vehicle. A front end 118 of the frame 36 is also designed to contain a generator of the recreational vehicle 32. Additionally, by placing the engine block 122 at the rear of the vehicle 116, the overall living space of the vehicle 32 is increased.

As noted above the frame 36 has a generally cage like structure defined by the vertical and lateral supports 110, 112. As a result, various other equipment typically included in class A RV's can be mounted onto the frame 36. For example the frame 36 can contain various storage compartments, clean and dirty water tanks 130, an LP tank system, a hydraulic jack system, electric steps, etc. The frame 36 also includes the vehicle's 32 suspension system, braking, and other driving control systems. In certain embodiments, the suspension system is an independent suspension design, and can be an air type suspension system.

Figure 6:
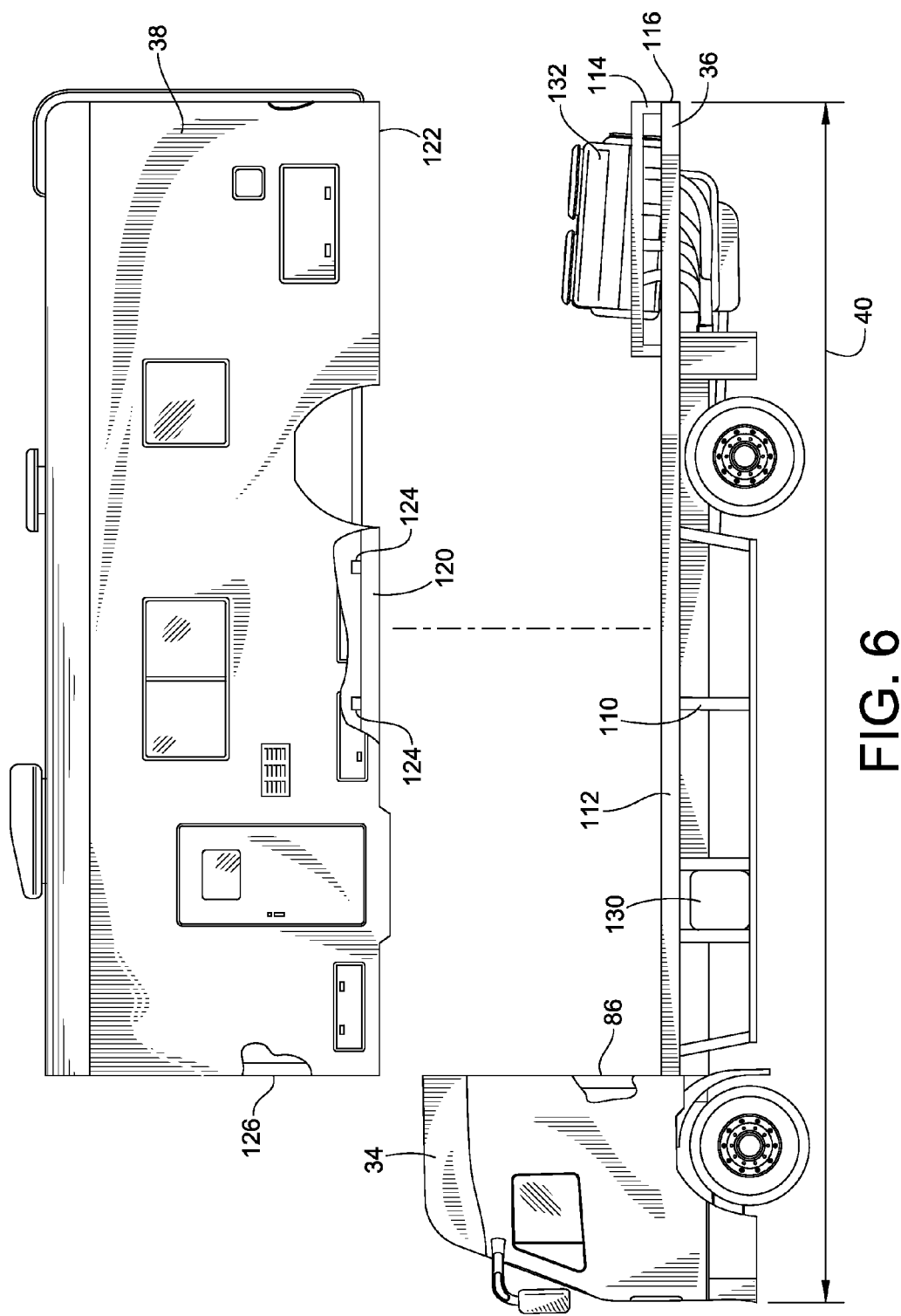
FIG. 6 is a side exploded view of the recreational vehicle of FIG. 3 with the cap of FIG. 4 and a living space installed on the frame.

Referring now to FIG. 6, the living space 38 is illustrated with aesthetic paneling 122 mounted upon a structural frame 120. The structural frame 120 includes a plurality of mounts 124 to mount the living space 38 to the frame 36. As noted above, the living space 38, and more particularly the structural frame 120, has a leading edge 126 configured to mate with the mounting edge 86 of the back end 62 of the cap 34. Further, the living space has a generally open front end proximate the leading edge 126 such that the living space 38 and the cap 34 are in direct communication with one another when the living space 38 is installed. Put differently, the driving space defined by the cap 34 and the interior of the living space 38 generally define a continuous interior of the recreational vehicle when assembled.

The cap 34 can be supplied with the frame 36 alone as a module. This enables a class C RV manufacturer that is not well versed the design of a cap 34 and its associated instrumentation and control ordinarily manufactured by class A manufacturers to nonetheless use their existing manufacturing process to fabricate an RV that incorporates a cap 34. When supplied as a module, the cap 34 is mounted on the frame 36 as illustrated in FIG. 5. The module also includes the engine block, suspension, braking systems and the like such that the class C manufacturer need only add the living space 38 as illustrated in FIG. 6.

When the cap 34 and frame 36 are supplied as a module, a class C RV manufacturer can rapidly complete the manufacture of a recreational vehicle by installing the living space 38 onto the frame 36. Once mounted to the frame 36, the living space 38 and cap 34 are mechanically joined via welding, bolting, adhesives and/or other methods. Once joined, the class C RV manufacturer can then complete the installation of various interior elements, such as seating, carpeting, appliances, etc.

As described herein, the improved recreational vehicle 32 offers the benefits of a class A RV in a class C RV package. The improved recreational vehicle 32 accomplishes this functionality in part by utilizing a cap 34 that has the same body style of a cap of a larger class A RV. The cap 34 has the structural rigidity of a smaller class C RV cab design while maintaining a class A RV appearance by incorporating an A pillar 90 and a B pillar 92 in opposing sides 64, 66 of the cab 34.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention especially in the context of the following claims is to be construed to cover both the singular and the plural, unless otherwise indicated herein or clearly contradicted by context. The terms "comprising," "having," "including," and "containing" are to be construed as open-ended terms i.e., meaning "including, but not limited to," unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language e.g., "such as" provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A recreational vehicle chassis, comprising:
   a frame;
   a cap mounted to the frame and enclosing a driving space; and
   wherein the cap and frame are configured to receive a living space of a recreational vehicle such that the living space does not extend over a top of the cap, and wherein the cap has a back end with an opening configured to provide access to the living space.

2. The chassis of claim 1, wherein the cap includes a generally vertical front end.

3. The chassis of claim 2, wherein the generally vertical front end has an angle of less than about 30 degrees relative to vertical.

4. The chassis of claim 2, wherein the cap includes a pair of sides in opposed spaced relation and extending transversely away from the generally vertical front end.

5. The chassis of claim 4, wherein each of the pair of sides includes a forward structural support member and a rearward structural support member, the forward structural support members coinciding with the generally vertical front end, and the rearward structural support members defining an end of the pair of sides.

6. The chassis of claim 5, wherein the rearward structural support members each provide mounting edges, the mounting edges configured to receive a portion of the living space.

7. A recreational vehicle chassis, comprising:
a frame;
a cap mounted to the frame and enclosing a driving space;
wherein the cap and frame are configured to receive a living space of a recreational vehicle, anal wherein the cap has a back end with an opening configured to provide access to the living space;
wherein the cap includes a generally vertical front end;
wherein the cap includes a pair of sides in opposed spaced relation and extending transversely away from the generally vertical front end;
wherein a roof is formed between the pair of sides, the roof including an opening, the opening configured to receive the living space.

8. The chassis of claim 7, wherein the opening in the roof and the opening in the back end of the cap form a continuous opening.

9. A recreational vehicle, comprising:
a chassis having an integral cap with a generally vertical front end, the cap carried by a frame of the chassis, the cap defining a driving space;
a living space mounted to the cap and mounted to the frame, the living space in direct communication with the driving space and not extending over a top of the cap.

10. A recreational vehicle, comprising:
a chassis having an integral cap with a generally vertical front end, the cap carried by a frame of the chassis, the cap defining a driving space;
a living space mounted to the cap and mounted to the frame, the living space in direct communication with the driving space; and
wherein the living space and the cap have a combined overall length of about 20 feet to about 40 feet.

11. The recreational vehicle of claim 10, wherein the living space includes an access door configured to provide an access point for ingress and egress from the recreational vehicle.

12. The recreational vehicle of claim 11, wherein the cap is free of any doors such that access to the driving space is provided through the living space.

13. The recreational vehicle of claim 9, wherein the chassis includes an engine block carried by the frame, the engine block located at an end of the frame opposite an end of the frame that carries the cap.

14. The recreational vehicle of claim 9, wherein the chassis is adapted to be supplied as a stand alone unit that receives the living space via mechanical connection.

15. A method for assembling a recreational vehicle, comprising:
attaching a cap to a frame to form a stand alone chassis of the recreational vehicle; and
attaching a living space to the frame and the cap after the step of attaching the cap to the frame is completed such that the living space and the driving space are in direct communication, and such that the living space does not extend over a top of the cap.

16. The method of claim 15, wherein the step of attaching the living space includes attaching the living space to the cap such that access to the cap is provided via the living space.

17. The method of claim 16, wherein the step of attaching the living space includes mechanically joining the living space to the cap.

18. A method for assembling a recreational vehicle, comprising:
attaching a cap to a frame to form a stand alone chassis of the recreational vehicle;
attaching a living space to the frame and the cap after the step of attaching the cap to the frame is completed such that the living space and the driving space are in direct communication;
wherein the step of attaching the living space includes attaching the living space to the cap such that access to the cap provided via the living space;
wherein the step of attaching the living space includes mechanically joining the living space to the cap; and
wherein the step of mechanically joining the living space to the cap includes aligning a mounting edge of the cap with a leading edge of the living space and mechanically joining the mounting edge with the leading edge.

19. The method of claim 18, wherein the step of mechanically joining includes at least one of welding, bolting, and adhering with an adhesive a structural frame of the cap to a structural frame of the living space.

20. The method of claim 15, wherein the step of attaching the living space to the cap and the frame includes attaching the living space such that the recreational vehicle has an overall length of between about 20 feet to about 45 feet.

* * * * *